United States Patent
Ide et al.

(10) Patent No.: US 7,187,427 B2
(45) Date of Patent: Mar. 6, 2007

(54) FLAT PANEL TYPE DISPLAY APPARATUS

(75) Inventors: Shigeo Ide, Yamanashi-ken (JP); Tomihiro Oguchi, Yamanashi-ken (JP)

(73) Assignee: Pioneer Corporation, Tokyo (JP)

( * ) Notice: Subject to any disclaimer, the term of this patent is extended or adjusted under 35 U.S.C. 154(b) by 91 days.

(21) Appl. No.: 10/777,142

(22) Filed: Feb. 13, 2004

(65) Prior Publication Data
US 2004/0183484 A1    Sep. 23, 2004

(30) Foreign Application Priority Data
Mar. 5, 2003    (JP)    ............................. 2003-058570

(51) Int. Cl.
*G02F 1/1345* (2006.01)
(52) U.S. Cl. ...................................... 349/150; 349/152
(58) Field of Classification Search ......... 349/149–152
See application file for complete search history.

(56) References Cited

U.S. PATENT DOCUMENTS 6,639,589 B1 *  10/2003  Kim et al. ................... 345/206
7,002,812 B2 *  2/2006  Sakaki ........................ 361/803
2001/0033355 A1 * 10/2001  Hagiwara .................... 349/152

FOREIGN PATENT DOCUMENTS

JP    2002-351346    12/2002

* cited by examiner

*Primary Examiner*—Tan Ho
*Assistant Examiner*—Leith Al-Nazer
(74) *Attorney, Agent, or Firm*—Arent Fox PLLC

(57) ABSTRACT

It is an object of the invention to provide an improved flat panel type display apparatus allowing a low cost and a simplified wiring process. First and second terminal groups adjacent to each other as well as a third terminal group separated from the first and second terminal groups and are formed on the outside edge of a rear glass substrate of display section main body of the display apparatus. The first terminal group is comprised of connection terminals formed with wiring patterns connected to display electrodes. The second and third terminal groups and are connected to each other by predetermined wiring patterns. On connection end of TCP equipped with a driver IC, there are formed connecting terminals corresponding to the first and second terminal groups.

9 Claims, 6 Drawing Sheets

… …

FLAT PANEL TYPE DISPLAY APPARATUS

BACKGROUND OF THE INVENTION

The present invention relates to a flat panel type display apparatus such as plasma display panel, particularly to amounting structure of the plasma display panel.

The present application claims priority from Japanese Application No. 2003-58570, the disclosure of which is incorporated herein by reference.

Conventionally, as an effort to improve a mounting density and realize a high-density wiring, there has been known a mounting technique using TCP (Tape Carrier Package). For example, Japanese Unexamined Patent Application Publication No. 2002-351346 has disclosed a mounting technique which uses TCP to accomplish an internal wiring within a PDP (Plasma Display Panel).

According to the mounting technique disclosed in the above-mentioned patent publication, as shown in FIG. 1, in order to electrically amplify display signals fed from a printed board (circuit board) 12 and to supply the signals to a plurality of column electrodes provided on a rear glass substrate 5 of a display section main body, wiring connection is formed between the display section main body and the circuit board 12 provided on the backside of a metal chassis, by virtue of a TCP 8 containing an integrated circuit device 9 (driver IC) for power amplification.

As shown, a plurality of outgoing terminals (column electrode terminals) connected to a plurality of column electrodes are formed on a side edge 7 of the rear glass substrate 5, while a plurality of wiring patterns ensuring connection between the column electrodes and the circuit board 12 through the driver IC 9 are formed in the TCP 8.

Then, the column electrode terminals formed on the side edge 7 of the rear glass substrate 5 are connected to the end portions of the wiring patterns formed on an end portion 8a of the TCP 8, the TCP8 is drawn to the rear side of the metal chassis to fix the driver IC 9 to the metal chassis, and another end portion of the TCP8 is connected to the circuit board 12, thereby realizing the wiring connection between the circuit board 12 and the display section main body through the TCP 8.

In this way, TCP can be used to form a plurality of wiring patterns with a small wiring pitch. Particularly, according to the mounting technique disclosed in the above-mentioned patent publication, as schematically shown in FIG. 1, a plurality of wiring patterns (formed on the column electrode side) connected to the output terminals of the driver IC 9 and a plurality of their connecting end portions are formed in advance in the TCP 8. By electrically connecting such connecting end portions formed on the end portion 8a of the TCP 8 to the plurality of column electrode terminals formed with a small wiring pitch on the side edge 7 of the rear glass substrate 5, it is possible to realize a high-density wiring.

However, when a plurality of wiring patterns (on the circuit board side) for connecting a plurality of input terminals of the driver IC 9 to a plurality of connecting terminals of the circuit board 12 are to be formed in the TCP 8, since the pitch of the connecting terminals of the circuit board 12 is larger than the pitch of the input terminals of the driver IC 9, it is necessary for the wiring patterns on the circuit board side (for connecting the input terminals of the driver IC 9 to the connecting terminals of the circuit board 12) to be formed in accordance with the pitch of the connecting terminals of the circuit board 12. As a result, the TCP 8 has to be made undesirably long in its length.

Moreover, since tape used in TCP is usually expensive, it is difficult to avoid a high cost if a long TCP 8 is used to form a wiring connection between the rear glass substrate 5 and the circuit board 12.

Besides, since a large number of wiring patterns are formed with an extremely small pitch in the TCP 8, the wiring connection is required to be carried out with a high precision when positioning the end portion 8a of the TCP 8 with respect to the column electrode terminals formed on the rear glass substrate 5, and with a further high precision when positioning the other end portion of the TCP with respect to the connecting terminals of the circuit board 12. In addition, although the substrate (namely, film substrate) of TCP has flexibility to some extent, such flexibility is usually insufficient since it is usually made of a hard material. For this reason, if the TCP 8 is long in its length, a process for the above positioning becomes complex, resulting in a complex wiring process.

SUMMARY OF THE INVENTION

The present invention has been accomplished in view of the above problem, and it is an object of the present invention to provide an improved flat panel type display apparatus having an improved mounting structure which allows a simplified wiring process.

According to the present invention, there is provided a flat panel type display apparatus including a display section main body having a plurality of display electrodes arranged thereon and a tape carrier package connected to the display electrodes. In particular, one end of the display section main body is formed with i) a first terminal group connected to the plurality of display electrodes, ii) a second terminal group adjacent to the first terminal group, iii) a third terminal group electrically connected to the second terminal group through wiring patterns. Specifically, a connection end of the tape carrier package is connected to the first terminal group and the second terminal group, while a flat cable for external wiring is connected with the third terminal group.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

One embodiment of the flat panel type display apparatus according to the present invention will be described below with reference to the accompanying drawings. In fact, the following description will explain a plasma display panel 10 which has a mounting structure using TCP (tape carrier package), thus providing a preferred embodiment of the present invention.

Figure 1:
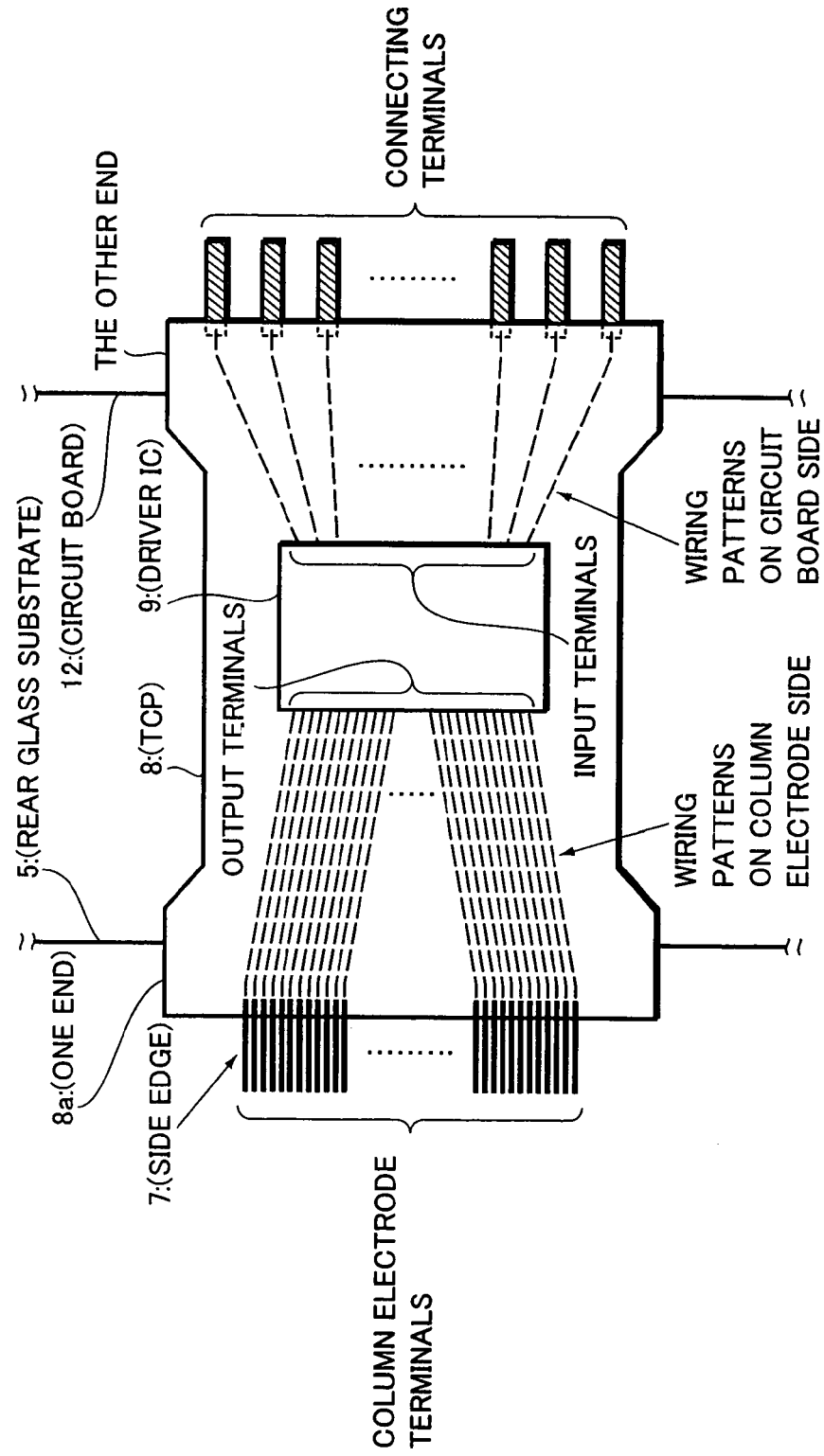
FIG. 1 is a plan view showing a mounting structure according to a prior art.
Figure 2:
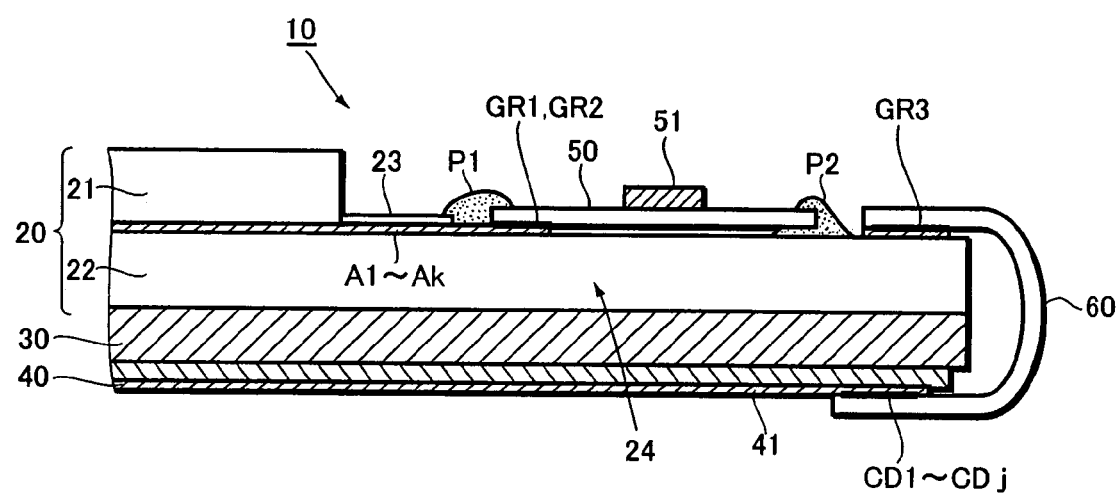
FIG. 2 is a longitudinal section schematically showing the structure of a plasma display panel and a wiring structure using TCP, according to an embodiment of the present invention.

FIG. 2 is a longitudinal section schematically showing the structure of the plasma display panel 10 and its wiring structure using TCP.

As shown, the plasma display panel 10 has a display section main body 20 including a front glass substrate 21 and a rear glass substrate 22, a metal chassis 30 provided on the backside of the rear glass substrate 22, and a circuit board 40 provided on the backside of the metal chassis 30. Further, the plasma display panel 10 has a TCP 50 mounting a driver IC 51 and a thin sheet-like flat wiring cable 60 (hereinafter, referred to as "flat cable") having a plurality of wiring patterns sandwiched between plastic films and having a predetermined flexibility, thereby realizing an external wiring between the display section main body 20 and the circuit board 40. Here, the flat cable 60 for realizing the external wiring is FPC (Flexible Printed Circuit) having a certain flexibility or FFC (Flexible Flat Cable).

In more detail, the display section main body 20 comprises the front glass substrate 21 and the rear glass substrate 22, which are disposed to face each other with an electric discharge space (filled with a rare gas) interposed therebetween. Further, a plurality of row electrodes are formed with a predetermined pitch on the inner surface (facing the rear glass substrate 22) of the front glass substrate 21, while a plurality of column electrodes are formed (orthogonal to the row electrodes) with a predetermined pitch on the inner surface (facing the front glass substrate 21) of the rear glass substrate 22.

In this way, each intersection of a row electrode with a column electrode forms an electric discharge cell, thereby forming a plurality of discharge cells by virtue of the respective row electrodes and column electrodes. The plurality of discharge cells can perform electric discharge and light emission can be effected corresponding to a driving electric power (for display) supplied to the respective electrodes from the driver C51, thereby displaying an image or the like.

Further, a plurality of wiring patterns A1–Ak constituting a plurality of outgoing lines, power supply lines and earth lines connected to the respective column electrodes serving as display electrodes, are formed with a small wiring pitch on the outside edge 24 of the rear glass substrate 22, while connecting terminals CA1–CAk are formed on the front end portions of the respective wiring patterns A1–Ak. Moreover, almost entire areas of the top surfaces of the wiring patterns A1–Ak are covered by an insulating damp-proof film 23, with the connecting terminals CA1–CAk constituting a first terminal group GR1.

Furthermore, a second terminal group GR2 consisting of connecting terminals CB11–CB1m and CB21–CB2n are also formed on the outside edge 24 of the rear glass substrate 22, in positions adjacent to the first terminal group GR1. Meanwhile, a third terminal group GR3 consisting of connecting terminals CC11–CC1m and CC21–CC2n is formed in a predetermined position more outward than the first and second terminal groups GR1 and GR2. In addition, a plurality of wiring patterns are connected corresponding to connecting terminals CB11–CB1m and CB21–CB2n of the second terminal group GR2, as well as connecting terminals CC11–CC1m and CC21–CC2n of the third terminal group GR3.

As will be described in detail later, formed on the substrate (i.e., film substrate) of TCP 50 are connecting terminal group provided on an end portion 52 (hereinafter, referred to as connecting end portion) of the substrate, and predetermined wiring patterns connected to the connecting terminal group and the driver IC 51. Then, the connecting terminal group is connected to the first and second terminal groups GR1 and GR2 by thermo-press bonding, while both ends of the TCP 50 are fixed to the outside edge 24 by damp-proof adhesive agents P1 and P2, thereby forming a desired wiring by virtue of the TCP 50.

Namely, the predetermined connecting end portion 52 on one side of the TCP 50 serves as connecting portion for the above connecting terminal group. Here, the connecting end portion 52 is connected to the first terminal group GR1 formed with the wiring patterns A1–Ak, and also connected to the second terminal group GR2 connected with the third terminal group GR3, thereby forming a wiring connection between the first terminal group GR1 and the third terminal group GR3 through the TCP 50.

Further, an electrical circuit for performing display control or the like, and a plurality of wiring patterns 41, as well as connecting terminals CD1–CDj are formed on the circuit board 40. These connecting terminals CD1–CDj and third terminal group GR3 are connected to each other by the flat cable (FPC or FFC) 60.

Thus, in the present embodiment, the first terminal group GR1 provided in the wiring patterns A1–Ak and the second terminal group RG2 linked to the third terminal group GR3 are connected to each other through the TCP 50, while the third terminal group GR3 and the connecting terminals CD1–CDj on the circuit board 40 side are connected to each other by the flat cable 60, thereby forming a desired wiring connection between the display section main body 20 and the circuit board 40.

In this way, once display signals such as video signals are outputted through the connecting terminals CD1–CDj from the circuit board 40, the driver IC 51 will supply, through the wiring patterns A1–Ak, driving electric power (for display) corresponding to the display signals to the above-mentioned column electrodes in the display section main body 20.

Moreover, as discussed above, since wiring connection is formed between the display section main body 20 and the circuit board 40 through the TCP 50 and the flat cable 60, the display section main body 20 and the circuit board 40 are connected with common earth, while a predetermined power source voltage (for actuation) is supplied to the display section main body 20 from the circuit board 40.

The wiring structure according to the present invention will be described with reference to FIGS. 3–5.

Figure 3:
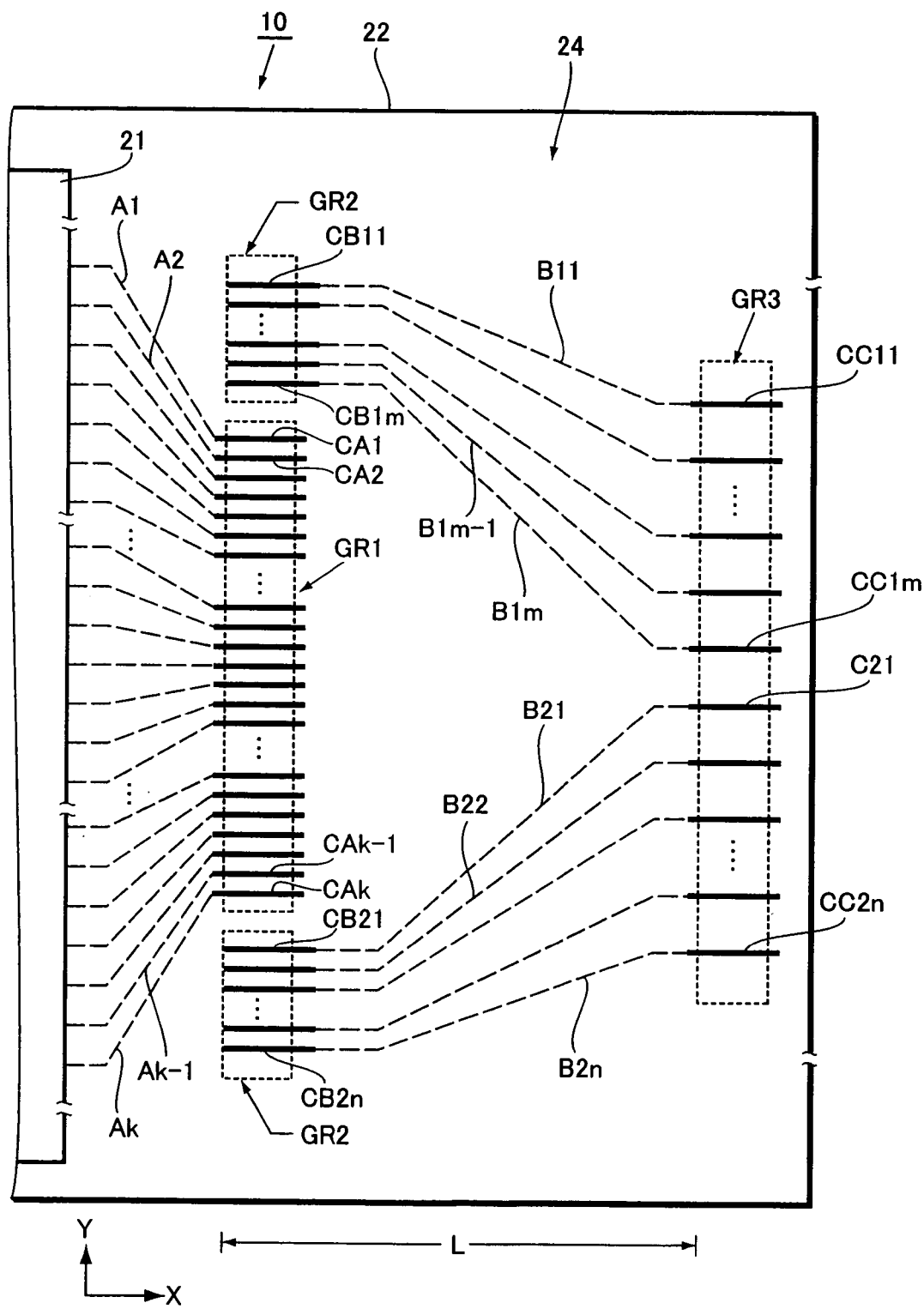
FIG. 3 is a plan view showing wiring patterns formed in the plasma display panel of the embodiment.
Figure 4:
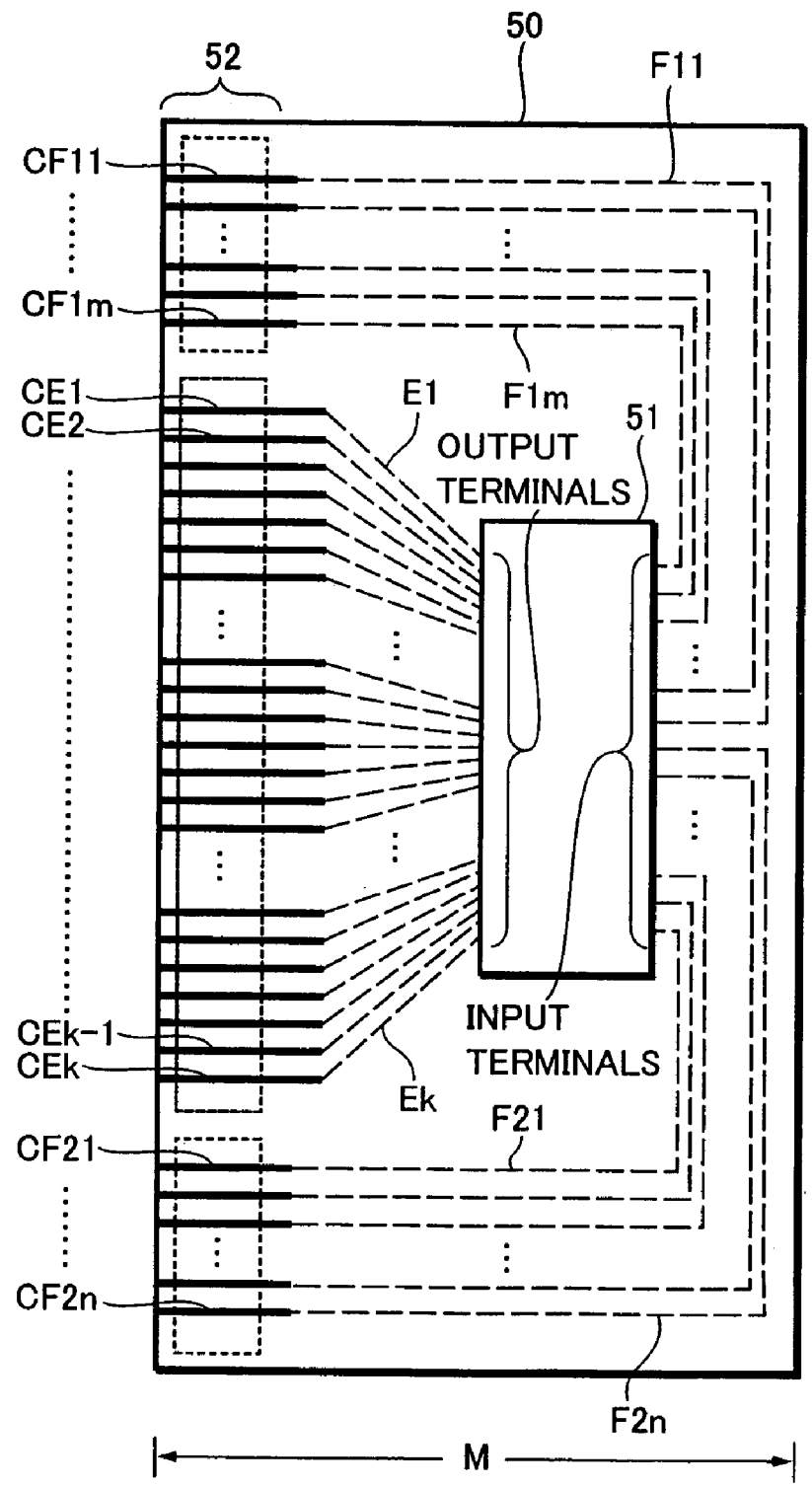
FIG. 4 is a plan view showing wiring patterns formed on the TCP of the embodiment.
Figure 5:
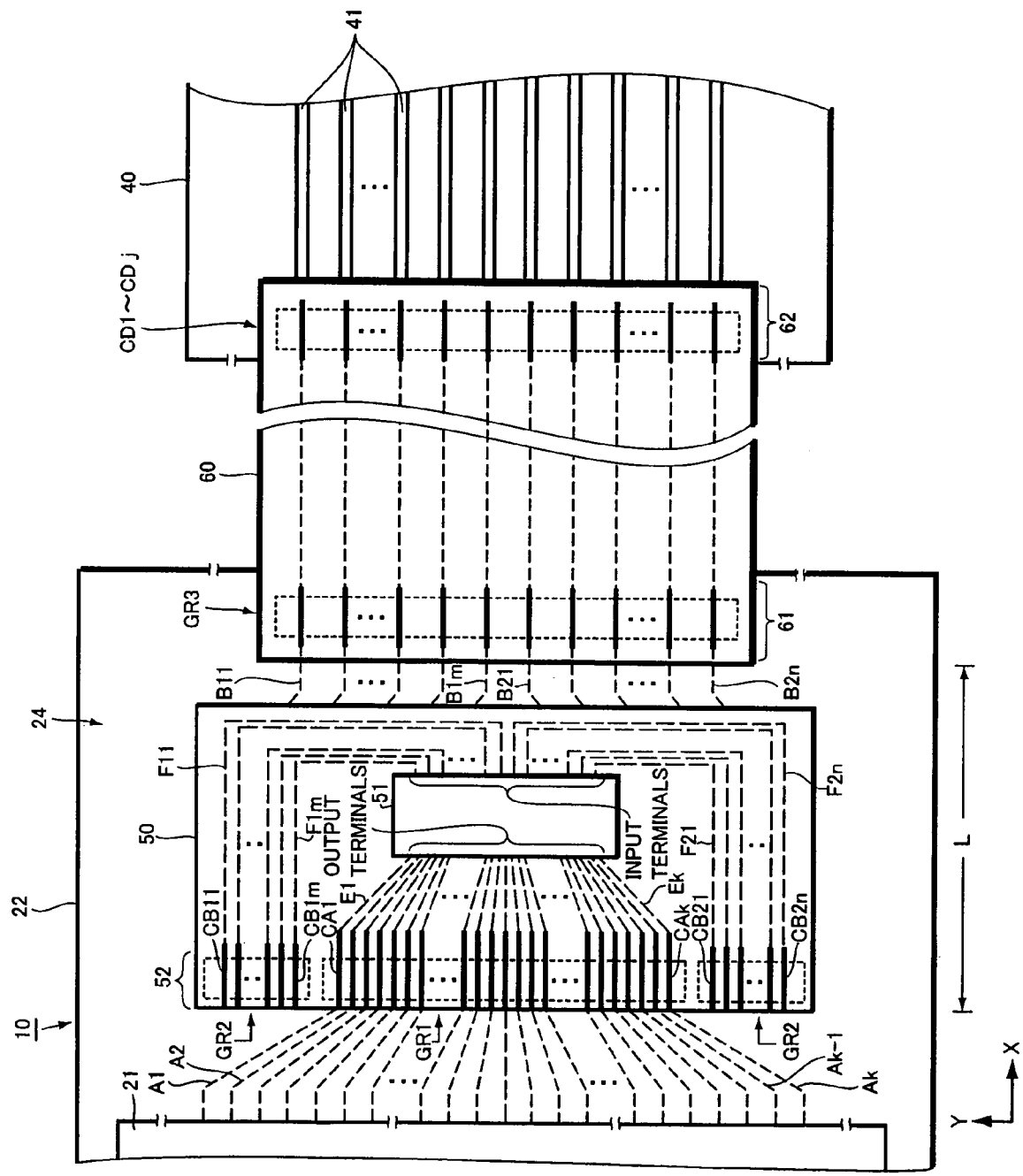
FIG. 5 is a plan view showing an expanded state of the wiring structure shown in FIG. 2.

In detail, FIG. 3 is a plan view showing wiring patterns and connecting terminals or the like formed on the side edge 24 of the rear glass substrate 22, FIG. 4 is another plan view showing wiring patterns and connecting terminals or the like formed on the TCP 50, FIG. 5 is a further plan view illustrating an expanded state of the wiring structure shown in FIG. 2.

As shown in FIG. 3, a plurality of wiring patterns A1–Ak constituting a plurality of outgoing lines (linked to the respective column electrodes), power supply lines, and earth lines are formed by vapor deposition with a small wiring pitch on the outside edge 24 of the rear glass substrate 22 of the plasma display panel 10.

On the front ends of the wiring patterns A1–Ak there are formed a plurality of connecting terminals CA1–CAk having an electric conductivity and connected to the TCP 50.

These connecting terminals CA1–CAk are arranged in one column along the direction Y orthogonal to an extending direction X of the wiring patterns A1–Ak. Specifically, the connecting terminals CA1–CAk and their adjacent areas are exposed without being covered by the insulating film 23 shown in FIG. 2. In this way, the first terminal group GR1 is formed by virtue of the connecting terminals CA1–CAk.

In particular, of the wiring patterns A1–Ak and the connecting terminals CA1–CAk, the wiring pattern A1 and the connecting terminal CA1 are used as power supply lines, while the wiring pattern Ak and the connecting terminal CAk are used as common earth lines, with the remaining wiring patterns A2–Ak–1 and the remaining connecting terminals C2–CAk–1 being connected to the column electrodes.

On both sides of the connecting terminals CA1–CAk serving as the first terminal group GR1, there are formed a plurality of connecting terminals CB11–CB1m and CB21–CB2n having an electric conductivity and constituting the second terminal group GR2, arranged in one column along the direction Y (in which the column electrodes are arranged). These connecting terminals CB11–CB1m and CB21–CB2n and their adjacent areas are exposed without being covered by the insulating film 23 shown in FIG. 2.

In an outer area separated by an interval L from the first and second terminal groups GR1 and GR2, there are formed a plurality of connecting terminals CC11–CC1m and CB21–CB2n exposed and having an electric conductivity and arranged in one column, thereby forming the third terminal group GR3 (to be connected by the flat cable 60) by virtue of the connecting terminals CC11–CC1m and CB21–CB2n.

Furthermore, a plurality of wiring patterns B11–B1m and B21–B2n having an electric conductivity and to be connected corresponding to the connecting terminals CB11–CB1m and CB21–CB2n of the second terminal group GR2 and also corresponding to the connecting terminals CC11–CC1m and CB21–CB2n of the third terminal group GR3, are formed by vapor deposition or the like, with the top surfaces of these wiring patterns B11–B1m and B21–B2n being covered by a damp-proof insulating film.

Of the wiring patterns B11–B1m and B21–B2n which form wiring connection between the second terminal group GR2 and the third terminal group GR3, the wiring pattern B1m is used as a power supply line and the wiring pattern B21 is used as a common earth line, with the remaining wiring patterns B11–B1m–1 and B22–B2n serving as signal input lines for inputting display signals supplied from the circuit board 40 through the flat cable 60.

Next, the structure of the TCP 50 will be descried with reference to FIG. 4.

The TCP 50 has a length M extending from its predetermined connecting end portion 52 to the other end thereof, which is shorter than an interval L (shown in FIG. 3) between the first, second terminal groups GR1, GR2 and the third terminal group GR3. Therefore, when the TCP 50 is connected to the first and second terminal groups GR1 and GR2, the TCP will be received within the interval L.

On the end portion 52 (namely, an end portion of the film substrate) there are formed in one column the connecting terminals CE1–CEk, CF11–CF1m, and CF21–CF2n corresponding to the connecting terminals CA1–CAk, CB11–CB1m, and CB21–CB2n of the first and second terminal groups GR1 and GR2 (shown in FIG. 3).

Namely, the connecting terminals CE1–CEk are formed with the same pitch as the connecting terminals CA1–CAk of the first terminal group GR1, while the connecting terminals CF11–CF1m and CF21- CF2n are formed with the same pitch as the connecting terminals CB11–CB1m and CB21–CB2n of the second terminal group GR2. Furthermore, the positional relations among the connecting terminals CE1–CEk, the connecting terminals CF11–CF1m and CF21–CF2n are set to be the same as the positional relation between the first terminal group GR1 and the second terminal group GR2.

Moreover, these connecting terminals CE1–CEk, CF11–CF1m, and CF21–CF2n are formed of a metal having an electric conductivity, and exposed to both the front side and back side of the TCP 50 by virtue of a via-hole structure.

Furthermore, not only the conductive wiring patterns E1–Ek effecting wire connection between the connecting terminals CE1–CEk and the respective output terminals of the driver IC 51 are formed, but also the conductive wiring patterns F11–F1m and F21–F2n effecting wire connection between the connecting terminals CF11–CF1m, CF21–CF2n and the respective output terminals of the driver IC 51 are formed, with the TCP 50 (except the connecting terminals CE1–CEk, CF11–CF1m, and CF21–CF2n) being covered by the damp-proof insulating film or the like.

For example, the connecting terminals CF1, CF1m and the wiring patterns E1, F1m are used as power supply lines. The connecting terminals CEk, CF21 and the wiring patterns Ek, F21 are used as common earth lines. The connecting terminals CF11–CF1m–1, CF22–CF2n and the wiring patterns F11–F1m–1 and F22–F2n are used as signal input lines for inputting display signals to the driver IC 51. The connecting terminals CE2–CEk–1 and the wiring patterns E2–Ek–1 are used as output lines for transmitting the driving electric power (for display) outputted from the driver IC 51.

When the display section main body is wire-connected to the circuit board 40, as shown in FIG. 5, the connecting terminals CA1–CAk, CB11–CB1m, and CB21–CB2n of the first and second terminal groups GR1, GR2 are made coincident (in position) with the connecting terminals CE1–CEk, CF11–CF1m and CF21–CF2n formed in the connection end portion 52 of the TCP50. Meanwhile, using an anisotropic conductive adhesive agent and by virtue of thermo-press bonding, the first and second terminal groups GR1, GR2 are connected mechanically and electrically to the connecting terminals CE1–CEk, CF11–CF1m, and CF21–CF2n of the TCP 50 in only one step of operation. Subsequently, the TCP 50 is fixed to the rear glass substrate 22 side by means of damp-proof adhesive agents P1 and P2, as shown in FIG. 2.

Furthermore, one connecting portion 61 of the flat cable 60 is connected to the connecting terminals CC1–CC1m and CC21–CC2n of the third terminal group GR3, while the other connecting portion 62 of the flat cable 60 is connected to the connecting terminals CD1–CDj of the circuit board 40, all using an anisotropic conductive adhesive agent and by means of thermo-press bonding in only one step of operation, thereby realizing the wiring structure of the present invention.

In this way, according to the present embodiment, since the TCP 50 is mounted on the outside edge 24 of the rear glass substrate 22, the length M of the TCP 50 can be shortened. Accordingly, as compared with the above-discussed prior art in which a long TCP is drawn around, the mounting structure has been greatly simplified and an internal space for receiving the mounting structure can be reduced, thereby making it possible to reduce production cost.

Moreover, as shown in FIG. 3 and FIG. 4, since the connecting terminals CE1–CEk, CF11–CF1m, and CF21–CF2n for connecting the TCP 50 to the first and second terminal groups GR1 and GR2 (formed on the rear glass substrate 22 side) are collected in the connecting end portion on one side of the TCP 50, the TCP 50 can be connected to the first and second terminal groups GR1, GR2 in only one step of operation (thermo-press bonding). Further, it is easy to set and adjust the positions of the connecting terminals CE1–CEk, CF11–CF1m, and CF21–CF2n with respect to the first and second terminal groups GR1 and GR2. Meanwhile, it is also easy to change or repair an installed TCP 50.

In addition, since the rear glass substrate 22 and the circuit board 40 are connected to each other through the flat cable 60 such as cheap FPC and FFC or the like, it is allowed to reduce production cost. Further, as compared with the above-discussed prior art in which along TCP is drawn around, the mounting structure has been greatly simplified and an internal space for receiving the mounting structure can be reduced.

Furthermore, since it is allowed to use cheap FPC or FFC to form the flat cable 60, the length of the flat cable 60 can be easily set. Besides, since it is possible to make use of some favorable properties of FPC and FFC or the like which ensure an easy bending processing or the like, the flat cable 60 can be freely laid out in an actual wiring process, thereby making it possible to improve a freedom in designing a mounting structure, as well as a freedom in an actual wiring process.

On the other hand, a plasma display apparatus has long since been required to have its frame (for accommodating the display section main body 20 and the mounting structure) made in a thin thickness. In response to this requirement, the present embodiment provides a simplified wiring structure based on the TCP 50 and the flat cable 60, thus making it possible to reduce the thickness of the edge portion of the frame.

Although an embodiment shown in FIGS. 2–5 describes a wiring structure formed by using one TCP 50 and one flat cable 60 corresponding to the TCP, it is also possible to use a plurality of TCPs and one flat cable corresponding to the TCPs, there by forming a modified embodiment of the present invention.

Figure 6:
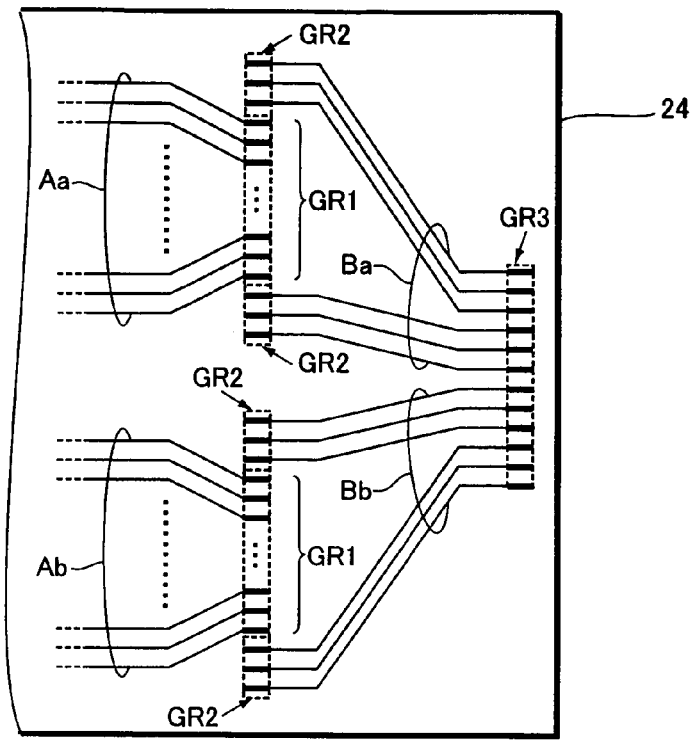
FIGS. 6A and 6B are plan views showing a modified embodiment of the present invention.
Figure 6:
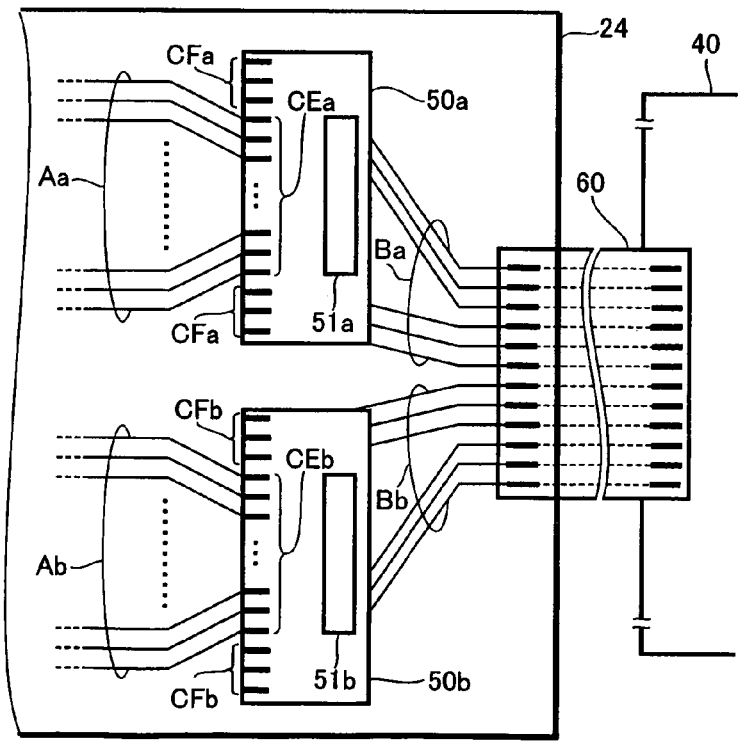

FIG. 6 is a plan view schematically showing another wiring structure as the modified embodiment of the present invention. However, elements identical with or corresponding to those in FIGS. 2–5 will be represented by the same reference numerals.

As shown in FIG. 6A, a plurality of wiring pattern groups Aa and Ab connected with and extending from a plurality of column electrodes are formed on the outside edge 24 of the rear glass substrate 22, with each of these wiring pattern groups Aa and Ab being connected with a first terminal group GR1 arranged in one column. Further, a plurality of second terminal groups GR2 arranged in one column are formed adjacent to the first terminal group GR1 of the wiring pattern group Aa and the first terminal group GR1 of the wiring pattern group Ab.

Furthermore, a third terminal group GR3 is formed and collected in a position separated a predetermined distance from the first terminal groups GR1 and the second terminal groups GR2. In addition, the connecting terminals of the third terminal group GR3 are connected to the connecting terminals of the second terminal groups GR2 through wiring pattern groups Ba and Bb.

Then, as shown in FIG. 6B, during an actual wiring process, an anisotropic conductive adhesive agent is used to perform a thermo-press bonding to connect (in one step of operation) the TCP 50a to the first terminal group GR1 and the second terminal groups GR2 relevant to the wiring pattern groups Aa and Ba. Similarly, another TCP 50b is connected to the first terminal group GR1 and the second terminal group GR2 relevant to other wiring pattern groups Aa and Ba.

Namely, similar to the TCP 50 described with reference to FIG. 4, connection terminal groups CEa and CFa corresponding to the first terminal group GR1 and the second terminal group GR2 are formed in an end portion on one side of TCP 50a equipped with an electronic device such as driver IC 51a. Meanwhile, connection terminal groups CEb and CFb corresponding to the first terminal group GR1 and the second terminal group GR2 are formed on the TCP 50b equipped with an electronic device such as driver IC 51b.

Than, in an actual wiring process, an anisotropic conductive adhesive agent is used to perform a thermo-press bonding so as to connect the terminal group including terminals CEa, CFa, CEb, CFb, and the first terminal group GR1 and second terminal groups GR2 (corresponding to the terminal group) in only one step of operation.

Furthermore, the flat cable 60 such as FPC or FFC is connected between the third terminal group GR3 and the circuit board 40 by the thermo-press bonding using the anisotropic conductive adhesive agent.

In this modified embodiment of the present invention, since the third terminal group GR3 for connecting the flat cable 60 can be collected in only one position, even when a plurality of TCPs 50a and 50b are to be attached, it is still possible to easily and quickly connect the third terminal group GR3 to the circuit board 40, thereby obtaining an improved efficiency for wiring process. Besides, it is allowed to reduce the number of parts required in the wiring structure.

However, the wiring structure according to the present embodiment (including the modified embodiment) should not be limited to the above-described structure in which an electric power (for display) is supplied to the column electrodes formed in the display section main body of a plasma display apparatus, but can also be applied to various other wiring structures.

Moreover, although the wiring structure according to the present embodiment (including the modified embodiment) relates to a plasma display apparatus, such wiring structure can also be applied to other flat panel type display apparatus such as a liquid crystal display or the like.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A flat panel type display apparatus, comprising:
    a display section main body having a plurality of display electrodes arranged thereon; and
    a tape carrier package connected to the display electrodes, wherein one end of the display section main body is formed with:
        i) a first terminal group connected to the plurality of display electrodes,
        ii) a second terminal group positioned adjacent to the first terminal group, wherein the second terminal group comprises a first plurality of connecting terminals, and
        iii) a third terminal group comprising a second plurality of connecting terminals,
        wherein only each of the first plurality of connecting terminals are directly connected to a corresponding one of the second plurality of connecting terminals via at least one wire on a common substrate, wherein a connection end of the tape carrier package is connected to the first terminal group and the second terminal group, and wherein a flat cable for external wiring is connected with the third terminal group.

2. The flat panel type display apparatus according to claim 1, wherein the flat cable is formed by FPC or FFC.

3. The flat panel type display apparatus according to claim 1 or 2, wherein the first and second terminal groups are collected in a predetermined area at one end of the display section main body, the connection end of the tape carrier package is connected through one operation to the first and second terminal groups formed and collected in the predetermined area.

4. The flat panel type display apparatus according to claim 3, wherein the first and second terminal groups are formed by being arranged in one column in the predetermined area at one end of the display section main body.

5. The flat panel type display apparatus according to claim 1, wherein the tape carrier package is formed having connecting terminal groups to be connected to the first and second terminal groups located in a connecting terminal section, and an electronic device is connected between the connecting terminal group to be connected to the first terminal group and the connecting terminal group to be connected to the second terminal group.

6. The flat panel type display apparatus according to claim 5, wherein the electronic device is an integrated circuit device for supplying an electric power for display to the plurality of display electrodes.

7. The flat panel type display apparatus according to claim 1, wherein the flat cable is connected between a circuit board and the third terminal group.

8. The flat panel type display apparatus according to claim 1, wherein an interval between the first, second terminal groups and the third terminal group is larger than a length of the tape carrier package.

9. The flat panel type display apparatus according to claim 1, wherein the first and second terminal groups are separate and distinct from each other.

* * * * *